Dec. 29, 1970    Z. STACHURSKI    3,551,208
CELL WITH DISPLACEABLE ELECTRODE
Filed Dec. 12, 1966    2 Sheets-Sheet 2

INVENTOR
ZBIGNIEW STACHURSKI
BY Evelyn M. Sommer
ATTORNEY.

United States Patent Office 3,551,208
Patented Dec. 29, 1970

3,551,208
CELL WITH DISPLACEABLE ELECTRODE
Zbigniew Stachurski, Brooklyn, N.Y., assignor to Yardney International Corp., New York, N.Y., a corporation of New York
Filed Dec. 12, 1966, Ser. No. 600,870
Int. Cl. H01v 29/04
U.S. Cl. 136—86                                7 Claims

ABSTRACT OF THE DISCLOSURE

This invention is directed to an electrochemical cell or battery in which one of the electrodes is adapted to be displaced relative to the other electrode during normal operation of the cell or battery. The invention also includes a method of operating such cells so that at predetermined intervals the spacing between the two electrodes comprising the cell is modified.

---

Figure 1:
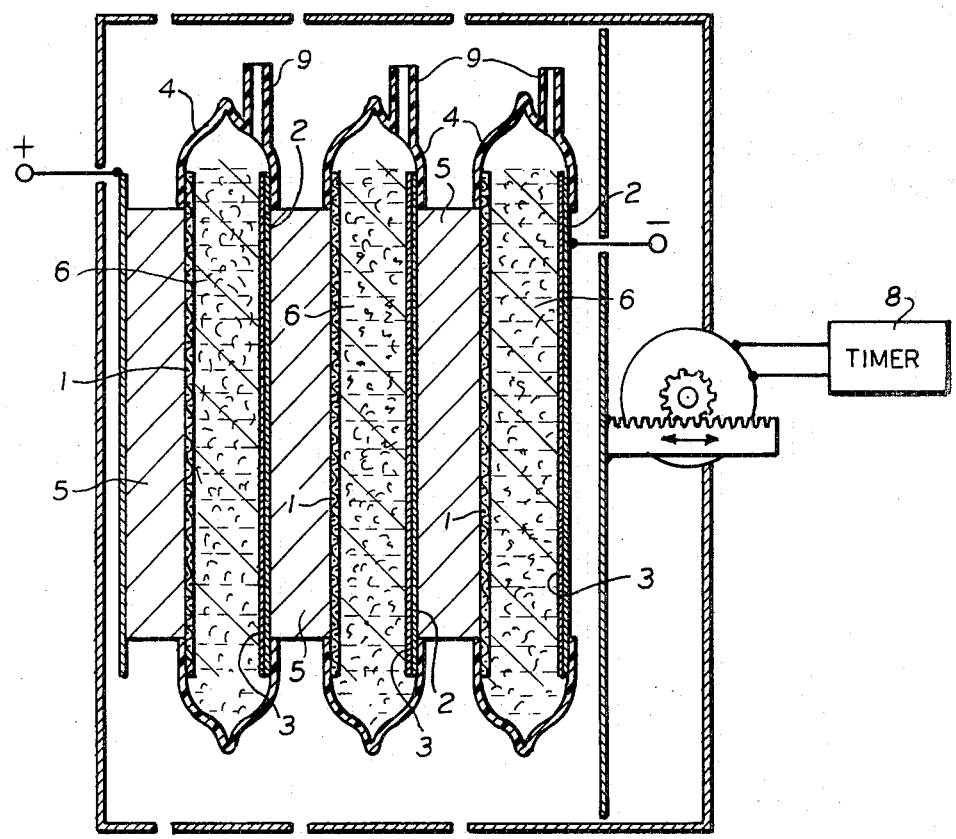

The present invention relates to current-generating electrochemical systems and, more particularly, to cells and batteries whose efficiency, useful life and applicability depend upon the interaction of one or more electrodes and an electrolyte in contact therewith.

As is well known, in the operation of electrochemical rechargeable cells, where one or both of the electrodes are soluble, difficulties are frequently encountered during the recharge phase of the operation. This is particularly true in the case of electrochemical cells which are based on a zinc negative. During the recharging operation, the zinc is deposited on the negative grid in the form of a sponge. This sponge may become extensive enough to bridge the gap between the positive and the negative electrodes, giving rise to a short circuit, thus putting the cell out of operation. A considerable and large number of methods have been proposed to overcome this difficulty. In the silver-zinc cell, for instance, it is common practice to wrap one or both of the electrodes in a semi-permeable membrane, such as cellophane. It has also been suggested that the electrolyte be circulated through the cell at a rate sufficient to control the form of the zinc being deposited. As is known, at sufficiently high rates of motion of the electrolyte relative to the electrode, the thickness of the so-called diffusion layer is decreased and the zinc tends to deposit in a relatively coherent dense form. This method of coping with the problem has the defect that it requires external pumps and manifolds to circulate the electrolyte and distribute it to the cells. Such pumps require the expenditure of substantial quantities of energy and, moreover, where the cell is one of many in a battery, electrolytic leakage currents through the manifold dissipate much of the energy. It has also been proposed that one or the other of the electrodes be rotated or otherwise translated in such a fashion as to move relatively to the electrolyte thus decreasing the thickness of the diffusion layer and effecting the deposition of the relatively dense coherent zinc deposit. See co-pending applications Nos. 441,069 and 441,265 both filed on Mar. 19, 1965). In the various realizations of these last two mentioned methods, the moving electrode is moved substantially within its own plane, that is, the electrode is rotated, moved as a belt, or oscillated back and forth, still within its own plane. In another form, the rotating electrode cooperates with a wiper or deflecting member disposed adjacent its surface, i.e., passes underneath a wiper which compresses or compacts the deposit, thus eliminating the possibility of a short by bridging. These methods based on a moving electrode which remains at all times within its own plane during the motion, have been found to be effective. However, they require that mechanical energy be transmitted to one or both of the electrodes, or to the wiper. This involves providing the cell with mechanical seals free of leakage problems which is very difficult if at all possible and also involves the expenditure of substantial quantities of energy.

It is an object of the present invention to provide a current-generating electrochemical system in which the difficulties in construction associaed with circulation of electrolyte and rotation of electrodes can be avoided.

It is another object of this invention to provide a rechargeable cell and a rechargeable battery based on soluble electrodes which are free from shorts, i.e., which are not subject to growth of shorting bridges.

It is a further object of this invention to provide a rechargeable cell and battery which are free of the requirement for mechanical seals which may leak.

It is a further object of this invention to provide a rechargeable cell and battery which require only a minimal amount of energy in order to function, free of shorts.

It is a further object of this invention to provide a rechargeable cell and battery which avoids shorts due to the fact that soluble electrodes are involved, and which are free of the problems of electrolytic leakage current.

These and further objects of this invention which will become apparent hereinafter are attained in accordance with the invention by providing a rechargeable cell and battery having at least two spaced apart electrodes wherein the space or distance between the electrodes is modified at predetermined intervals of time by displacing at least one of said electrodes relative to the other.

Figure 2:
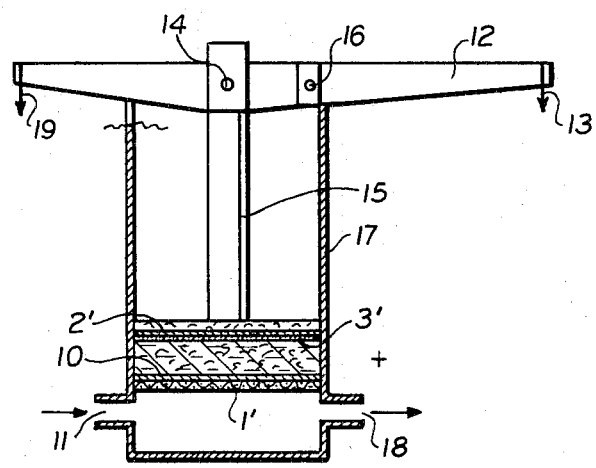
Figure 3:
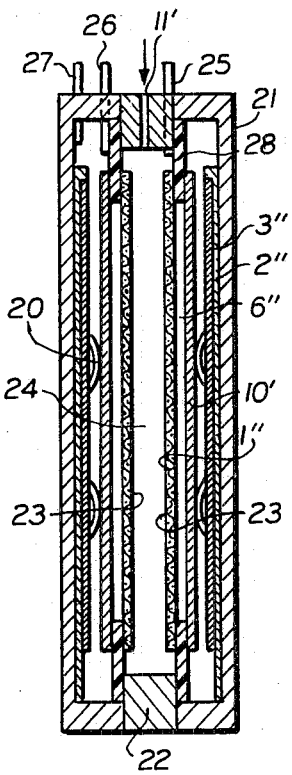
Figure 4:
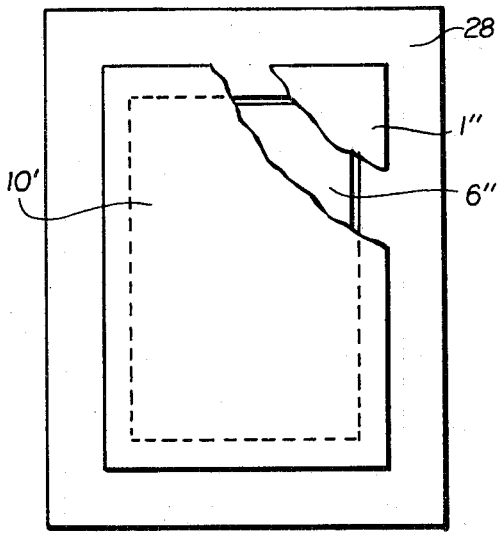
Figure 5:
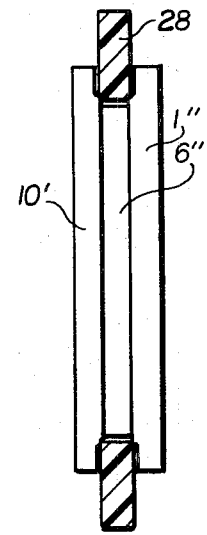

A better understanding of the present invention may be had from the following description when read with reference to the accompanying drawings of which:

FIG. 1 is a cross section of a battery comprising three cells in accordance with the present invention, FIG. 2 is a front elevation of an embodiment of an air-zinc battery in accordance with the invention, FIG. 3 is another embodiment of a battery in accordance with the invention, FIG. 4 is a top view showing in detail the electrode assembly of FIG. 3, and FIG. 5 is a more detailed representation in cross-section of the electrode assembly of FIG. 3.

In the battery shown in FIG. 1, the negative electrode comprises zinc and the positive electrode is an oxygen reduction electrode. The opposite walls of the cells are comprised of the oxygen electrode 1, and the current collector 2, which may be copper sheet. Zinc 3 is deposited on the current collector 2, during charge and is dissolved as zincate ion during discharge. The peripheral edges of the cell are constructed of flexible plastic 4. Suitable materials for this purpose are linear polyethylene or linear polypropylene in the form of sheets which can be heat-sealed to each other and to the current collector 2, and the oxygen electrode 1, to provide a leak-proof seal at these areas. The cells are spaced apart from each other by means of metallic ribs 5, which preferably are vertically disposed in order to provide access of air to the oxygen electrode 1. Preferably, an absorbent material 6, such as felt or like unwoven fabric for instance Pellon, is placed over the positive electrode and functions as an insulating, absorbent spacer.

The quantity of electrolyte in the cell is maintained so that the liquid level is essentially, at the top of the plates during normal charge and discharge. Part of the electrolyte is held by the absorbent material adjacent to the air electrode, and the remainder is distributed in the porous zinc deposit.

A timer/motor combination is provided and the same is constructed so as to cooperate, i.e., work together with the flexible plastic peripheral edges 4. At preset intervals, the timer 8 switches on the motor for a predetermined period. The motor, by means of a mechanical linkage, such as a rack and pinion is activated to compress the cells in the battery. As a result of this compression, the negative and the positive electrodes are made to approach each other more closely, which serves to displace a portion of the liquid from between the electrode plates, thus effectively stirring the liquid and further acting to reduce the thickness of the diffusion layer.

During the period of compression, the liquid level of electrolyte rises and is displaced into the standpipe and vent 9. At the end of the compression period, the motor is reversed by means of the timer and the electrodes are returned to their original positions as a result of which the cell assumes its original dimension i.e., thickness.

During charge, oxygen is generated at the oxygen electrode. This oxygen which must escape from the cells also leaves the cell through the vents 9. During discharge, it may be found desirable to force air through the oxygen electrode and, therefore, through the electrolyte. Such air then also leaves the cell through the standpipe and vent.

During the period of compression i.e., when the electrode plates are brought close together, the zinc is compacted. This reduces the length of any dendrites which are in the process of formation and therewith the formation of shorting bridges. Moreover, by proper regulation of the compression mechanism, the zinc deposit can be compressed to any density desired, and particularly to that density found to be optimum for the desired charge and discharge conditions. The absorbent and insulating layer 6, prevents the dendrites from shorting on the air electrode during this stage. As a result of this procedure, the zinc can be held at the optimum density for deposition of further zinc and for subsequent high rate discharge. It should be noted that while the above advantages are explained by reference to compression effected during charge, it has also been found that like advantages are achieved by compressing during discharge. These will be further explained in connection with the embodiment shown in FIG. 2.

Referring now to FIG. 2, there is shown a cell in which oxygen electrode 1', is combined with a negative electrode or collector 2' made of Fiberglas which has been plated with copper. This collector is fastened to a movable rod 15 which is supported from the torque arm 12, by means of pins 14 and 16, so that the negative collector can be moved up and down within the cell casing 17. The zinc electrode 3', in the embodiment illustrated in FIG. 2, is plated onto the copper collector 2'. It can be appreciated, however, that for some applications it is desirable that a separate charging electrode is supplied. In this case, a charging electrode 10', is used. In the embodiment shown, the charging electrode 10', consists of nickel plated Fiberglas, supported on unplated Fiberglas, which in turn, is supported on the oxygen electrode. The area of each electrode is 3.37 in.$^2$. The cell was charged with a zinc oxide slurry consisting of 6 grams of zinc oxide and 30 ml. of 31% KOH. The charging current was 1.1 a. (300 ma./in.$^2$) for the first 35 minutes of charge, 1.5 a. (400 ma./in.$^2$), for the next 2 hours 40 minutes. The air intake is shown at 11', and the outlet at 18'. The air pressure was maintained at ½ in. of water.

In order to charge the cell, the following procedure was followed: the cell was charged for 15 minutes at 400 ma./in.$^2$, the current was then interrupted and the zinc was compressed by putting a 300 g. weight at position 19' on the torque arm 12'. At the end of 15 seconds, the weight was removed from position 19' and placed at position 13', to raise the negative electrode to the stationary position. This procedure was repeated at the designated intervals throughout the charge operation. At the end of the 2 hours 40 minutes session, all of the zinc oxide slurry had been plated out and the cell had not shorted.

The cell can be discharged in a stationary position. However, the voltage falls off by about 20%, and the current falls off similarly. On a discharge at a current of 1.25 a. (340 ma./in.$^2$ of active area), the initial voltage fell from 1.0 to 0.9 v. and the current fell from 1.3 a. to about 1.1 a. The compression mechanism was then operated to close and open the plates for a few seconds once every five minutes. It was found that some fall-off in voltage and current occurred during the five-minute period, but each time, the compression took place, the voltage and current returned to their initial values.

It is clear, therefore, that decreasing the distance between the positive and negative electrode, in order to compress any dendritic deposit and to decrease the thickness of the diffusion layer, can prevent the formation of short circuits and make it feasible to cycle cells without separators and without removal of the electrolyte from the cell.

Referring now to FIG. 3, there is shown a rechargeable air-zinc cell comprising two multi-layer air electrode/charging electrode assemblies 23 of a substantially rectangular shape, each of which is cemented around its periphery to a frame-like elastic member 28 as shown in detail in FIGS. 4 and 5. The two elastic members are in turn cemented along their outer edges to the opposite sides of a rigid frame 22. In this manner, the two assemblies 23 are elastically suspended to the frame 22 and are capable of a displacement relative to this frame when a force is applied to their surface.

The two assemblies thus mounted on frame 22 define a hollow recess or core 24. Two sheets 2" described below in greater detail are arranged opposite and facing the two outer layers of assembly 23.

The elastic frame-like member 28 is preferably constructed of synthetic or natural rubber and the rigid frame 22 constructed of Lucite, phenol formaldehyde resin, or other like materials.

Each assembly 23 comprises three juxtaposed layers. The innermost layer 1" forms the internal wall of the recess 24 and serves as an air electrode. In the embodiment shown, it is constructed of a sheet formed from Teflon and carbon which includes a conductive grid provided with a current-collecting tab not shown in the drawing. Current collecting tabs of layers 1" of both assemblies 23 are connected internally to a common terminal 25. The intermediate layer 6" is a layer of Fiberglas. An absorbent material such as nylon felt or Pellon could be used as an alternative. The intermediate layer acts as an insulating electrolyte-absorbing spacer. The outer-layer 10' is constructed of nickel-plated Fiberglas. It is provided with a current collecting tab not shown in the drawing, and acts as a charging electrode. Current collecting tabs of layers 10' of both assemblies 23 are connected internally to a common terminal 26. If desired, a conductive perforated structure such as a nickel grid could be substituted for the nickel-plated Fiberglas.

Each outermost layer 10' faces a sheet 2" of substantially the same size which acts as a negative current-collector and as a support for receiving a deposit of active material 3" which in this instance is zinc. Sheet 2" is made of copper-plated Fiberglas and is provided with a tab not shown in the figure, connected internally to a terminal 27 common to both sheets 2". A solid sheet or a grid made of copper, silver or any other suitable metal could be used as a substitute for the copper-plated Fiberglas.

The sheet 2" is separated from the charging electrode 10' by means of deformable elastic members 20 constructed in the embodiment of Lucite and cemented to the charging electrode 10'. Members 20 could be made of other suitable deformable insulating material. If desired, instead of being attached to the charging electrode 10', members 20 could be cemented to sheet 2". They act in a spring-like fashion and in the absence of pressure forces serve as spacers 21. It is only necessary that one such member 20 be provided. However, they are preferably employed in multiples distributed over the surface of the charging electrode 10′, their number being determined by the size of the electrode.

The space between the air electrode 1″ and sheet 2″ is filled with an alkaline electrolyte.

If desired, a suitable separator may be interposed between the charging electrode 10′ and sheet 2″.

The frame is provided with an inlet opening 11′ whereby air can be introduced into the recess 24.

The system operates as follows:

Starting with a cell in discharged condition, most of the zinc is in the form of zincate ions and of zinc oxide particles present in suspension in the electrolyte.

A source of charging current is connected between terminals 26 and 27 whereby sponge zinc starts to deposit from the electrolyte onto sheet 2″ and oxygen is evolved on the charging electrode 10′. At predetermined time intervals compressed air is introduced into recess 24 causing the elastically suspended electrode assemblies 23 to move toward the respective sheets 2″ overcoming the elastic force of the members 28 and of the deformable members 20, until these assemblies come into pressure contact with the zinc 3″ deposited on sheets 2″. As explained in connection with FIG. 1, the pressure acts to compact the deposit and reduces the length of any dendrites which may be in the process of formation. When the pressure is released, the assemblies 23 return to their original position under the effect of the force exerted upon them by the elastic members 28 and deformable members 20.

As mentioned elsewhere in the application, changes in electrode spacing may also have a beneficial effect during discharge. During this phase of operation, a load is connected between tabs 25 and 27 and air at the atmospheric pressure or at a pressure slightly above is supplied to the recess 24. A change in electrode spacing may be achieved at predetermined intervals in the same fashion as during charge. The extent of electrode displacement is controlled by the pressure applied to the assemblies 23. For example, a pressure may be selected which will result in a displacement which will simply bring the electrodes closer together without resulting in an actual contact.

While FIG. 3 refers to an embodiment in which pressure is applied to a movable air electrode, the zinc electrode being stationary, it will be appreciated that the invention is also applicable to a system wherein the movable element is the negative electrode and the pressure is applied to the latter rather than to the air electrode.

Furhermore, pressure could be applied in more than one way. Thus, it may be made to act so as to cause the electrode to move away from each other overcoming the force of a spring and would tend to keep them close, contrary to the actions described above.

It can also be appreciated that the frame-like member 28 could be constructed of a rigid material such as Lucite or Bakelite and mounted in a track so that it could move to and fro therein depending on which surface the pressure was being directed.

It should be noted that, although the embodiments described in the drawings refer to the use of zinc as the negative active material, the invention is equally applicable to other known negative active materials, such as lithium, sodium, potassium, magnesium, calcium, barium, aluminum, and is particularly valuable for the following combinations: air-zinc, oxygen-zinc, nickel-zinc, silver-zinc and manganese dioxide-zinc.

In cases where the combination is a gas-depolarizable system, the gas electrode comprises a suitable catalyst. Catalysts found useful include such elements as carbon, silver, gold, nickel, porous nickel, cobalt, manganese, molybdenum, tungsten, elements of the platinum group and radioisotopes such as C 14, Ni 63, Co 60, Po 210 and the like.

Thus, in accordance with the invention, current generating electrochemical systems containing soluble electrodes are provided in which the spacing between the electrodes can be modified at predetermined intervals of time by displacing at least one of said electrodes relative to the other.

The housing for such system must, of necessity, be designed to accommodate the type of moving electrodes herein described. Thus, for example, the housing can be constructed at least in part of a flexible plastic or of a plastic which can be stretched and returned to its original dimensions over long periods. Further, the housing can be constructed so that sections thereof are telescoping. Still another form of construction is that akin to the bellows permitting expansion and compression without undergoing any permanent or undesirable shape change.

The invention is, of course, not limited to the specific embodiments described and illustrated but may be realized in various modifications and adaptations with departure from the spirit and scope of the appended claims.

I claim:

1. In a method of operating an electrochemical current generator with several electrodes including at least one rechargeable electrode separated from a coacting electrode by a yieldable electrolyte-permeated insert, in which the active material of said rechargeable electrode is alternately oxidized and reduced during respective discharging and charging cycles, the improvement which comprises successively decreasing and increasing during at least the charging cycle the mutual separation of said rechargeable electrode and said coacting electrode during at least one of said cycles with alternate compression and expansion of said insert therebetween.

2. The improvement defined in claim 1 wherein said insert is iteratively compressed and expanded during every charging cycle.

3. An electrode assembly for an electrochemical current generator, comprising a rechargeable first electrode, a second electrode coacting with said first electrode and defining an electrolyte space therewith, a yieldable insert interposed between said electrodes in said space, a liquid electrolyte permeating said insert in contact with confronting surfaces of said electrodes, and operating means for selectively alternately decreasing and increasing the mutual separation of said confronting surfaces during at least the charging cycle with compression and expansion, respectively, of said insert therebetween.

4. An assembly as defined in claim 3 wherein said first electrode comprises an active material soluble in said electrolyte.

5. An assembly as defined in claim 4 wherein said active material is zinc.

6. An assembly as defined in claim 3, further comprising resilient wall means forming a deformable envelope about said electrolyte space.

7. An assembly as defined in claim 3 wherein said second electrode is an air electrode.

References Cited

UNITED STATES PATENTS

| | | | |
|---|---|---|---|
| 1,588,608 | 6/1926 | Oppenheim | 136—86 |
| 2,976,342 | 3/1961 | Morehouse | 136—86X |
| 3,043,898 | 7/1962 | Miller et al. | 136—86 |
| 3,294,586 | 12/1966 | Le Duc. | |
| 2,914,595 | 11/1959 | Darland, Jr., et al. | 136—86 |
| 3,411,951 | 11/1968 | Gelting | 136—86 |

ALLEN B. CURTIS, Primary Examiner

U.S. Cl. X.R.

136—136